(12) United States Patent  
Bokelmann et al.

(10) Patent No.: US 7,878,597 B2
(45) Date of Patent: Feb. 1, 2011

(54) HEIGHT ADJUSTABLE HEAD RESTRAINT FOR A VEHICLE SEAT

(75) Inventors: Tobias Bokelmann, Gröbenzell (DE); Klaus Boes, Allershausen (DE); Juergen Geisslinger, Ellingen (DE)

(73) Assignee: Lear Corporation, Southfield, MI (US)

( * ) Notice: Subject to any disclaimer, the term of this patent is extended or adjusted under 35 U.S.C. 154(b) by 190 days.

(21) Appl. No.: 12/194,375

(22) Filed: Aug. 19, 2008

(65) Prior Publication Data

US 2009/0058163 A1    Mar. 5, 2009

Related U.S. Application Data

(60) Provisional application No. 60/969,804, filed on Sep. 4, 2007.

(30) Foreign Application Priority Data

Oct. 8, 2007    (DE) ........................ 10 2007 048 152

(51) Int. Cl.
   *B60R 21/055*    (2006.01)
(52) U.S. Cl. ..................................... 297/410
(58) Field of Classification Search .................. 297/410
   See application file for complete search history.

(56) References Cited

U.S. PATENT DOCUMENTS

| 3,563,602 | A | 2/1971 | Ohta et al. | |
|---|---|---|---|---|
| 4,671,573 | A * | 6/1987 | Nemoto et al. | ............... 297/410 |
| 6,364,415 | B1 | 4/2002 | Mori et al. | |
| 6,390,558 | B2 | 5/2002 | Fischer et al. | |
| 6,899,395 | B2 | 5/2005 | Yetukuri et al. | |
| 6,983,995 | B1 | 1/2006 | Veine et al. | |
| 7,073,863 | B1 | 7/2006 | Low et al. | |
| 7,137,668 | B2 | 11/2006 | Kreitler | |
| 7,232,187 | B1 | 6/2007 | Sundararajan et al. | |
| 7,316,455 | B2 | 1/2008 | Metz et al. | |
| 7,735,929 | B2 * | 6/2010 | Veine et al. | ................... 297/410 |
| 2001/0028191 | A1 | 10/2001 | Lance | |
| 2005/0146190 | A1 | 7/2005 | Taatjes | |
| 2006/0186720 | A1 * | 8/2006 | Linardi et al. | ................ 297/410 |

(Continued)

FOREIGN PATENT DOCUMENTS

DE    3805957 A1    9/1988

(Continued)

OTHER PUBLICATIONS

German Office Action for copending Application No. 10 2009 004 554.6 mailed Nov. 25, 2009, 2 pages.

(Continued)

*Primary Examiner*—Rodney B White
(74) *Attorney, Agent, or Firm*—Brooks Kushman P.C.

(57) ABSTRACT

A vehicle seat and vehicle seat head restraint are disclosed having a stop adapted to be mounted to a rod extending from a vehicle seat back. A frame is adapted to be mounted to the rod to slide along the rod. A head restraint foam padding and cover are mounted to the frame for supporting a head of an occupant. A locking mechanism cooperates with the stop and the frame for permitting incremental locking positions of the frame relative to the stop. An actuator cooperates with the locking mechanism for releasing the locking mechanism to slide the head restraint and frame along the rod.

19 Claims, 4 Drawing Sheets

U.S. PATENT DOCUMENTS

| | | | |
|---|---|---|---|
| 2006/0214491 A1* | 9/2006 | Metz et al. | 297/410 |
| 2006/0250017 A1* | 11/2006 | Otto et al. | 297/410 |
| 2007/0216211 A1 | 9/2007 | Mori | |
| 2008/0001456 A1 | 1/2008 | Muller et al. | |

FOREIGN PATENT DOCUMENTS

| | | | |
|---|---|---|---|
| DE | 19603911 A1 | 8/1997 |
| DE | 19714283 A1 | 11/1997 |
| DE | 19632560 A1 | 2/1998 |
| DE | 19737706 C1 | 1/1999 |
| DE | 10312517 A1 | 10/2004 |
| FR | 2852066 A1 | 9/2004 |
| GB | 2302706 A | 1/1997 |
| GB | 2340744 A | 3/2000 |

OTHER PUBLICATIONS

U.S. Office Action for copending U.S. Appl. No. 12/260,642, mailed Nov. 24, 2009, 6 pages.
Translation only of China Office Action for corresponding Application No. 2008101475587, mailed Feb. 26, 2010, 6 pages.
U.S. Appl. No. 12/260,642, Height Adjustable Head Restraint for a Vehicle Seat, filed Oct. 29, 2008, 26 pages.
U.S. Appl. No. 12/194,351, Adjustable Head Restraint For Vehicle Seat, filed Aug. 19, 2008, 30 pages.
German Office Action from corresponding Application No. DE10 2007 048 152, mailed Apr. 11, 2008, 3 pages.

* cited by examiner

HEIGHT ADJUSTABLE HEAD RESTRAINT FOR A VEHICLE SEAT

CROSS-REFERENCE TO RELATED APPLICATIONS

This application claims the benefit of U.S. provisional application Ser. No. 60/969,804, filed on Sep. 4, 2007 and claims priority to German Application No. 10 2007 048 152.9, filed on Oct. 8, 2007, the disclosures of which are hereby incorporated by reference in their entirety.

BACKGROUND OF THE INVENTION

1. Field of the Invention

The invention relates to height adjustable head restraints for vehicle seats.

2. Background Art

The prior art has offered height adjustable head restraints having a pair of rods connecting the head restraint to a frame of the vehicle seat. Typically, the head restraint and rods translate relative to the seat frame and the rods include a series of notches for locking the head restraint and rod at various positions relative to the frame of the seat back. The prior art has also offered head restraint rods that are mounted directly to the frame wherein the head restraint translates along the rods. Likewise, the rods include a series of notches for providing various height adjustment positions to the head restraint relative to the rod.

SUMMARY OF THE INVENTION

One embodiment of the present invention discloses a vehicle seat having a seat back for supporting the back of an occupant. A rod is mounted to and extends from the seat back. A stop is mounted to the rod. A frame is mounted to the rod to slide along the rod. A head restraint is mounted to the frame for supporting a head of an occupant. A locking mechanism cooperates with the stop and the frame for permitting incremental locking positions of the frame relative to the stop. An actuator cooperates with the locking mechanism for releasing the locking mechanism to slide the head restraint and frame along the rod.

Another embodiment of the present invention discloses a vehicle seat head restraint having a stop adapted to be mounted to a rod extending from a vehicle seat back. A frame is adapted to be mounted to the rod to slide along the rod. A head restraint foam padding and cover are mounted to the frame for supporting a head of an occupant. A locking mechanism cooperates with the stop and the frame for permitting incremental locking positions of the frame relative to the stop. An actuator cooperates with the locking mechanism to release the locking mechanism to slide the head restraint and frame along the rod.

The above embodiments and other embodiments, benefits, advantages and features of the invention are readily apparent from the following detailed description of the invention and the accompanying figures.

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
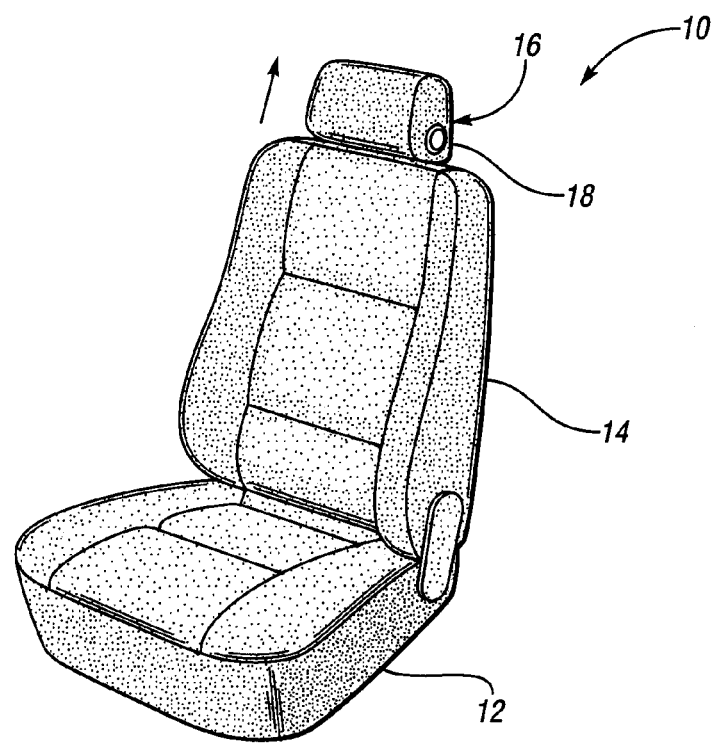
FIG. 1 is a perspective view of a vehicle seat in accordance with the present invention.

With reference now to FIG. 1, a vehicle seat is illustrated in accordance with the present invention and is referenced generally by numeral 10. The vehicle seat 10 includes a seat cushion 12 that is adapted to be installed within an interior of a vehicle, such as an automobile, aircraft, water craft or the like. The seat back 14 is also installed in the vehicle, and for the depicted embodiment, the seat back 14 is connected to the seat cushion 12. Although an individual seat is depicted in FIG. 1, the invention contemplates any seat configuration, such as a bench seat, a split frame seat, front row seat, rear row seat, or the like.

The seat cushion 12 and the seat back 14 are both fabricated from suitable and known materials and methods. For example, the seat cushion 12 and the seat back 14 may both utilize a structural frame, foam for cushioning and a cover.

The seat 10 also includes a head restraint 16 that is mounted to the frame of the seat back 14 and extends above the seat back 14 for supporting a head of an occupant. The head restraint 16 has a release button 18 mounted on a lateral side of the head restraint 16 for permitting an occupant to depress the button 18 and adjust the height of the head restraint 16 relative to the seat back 14.

Figure 2:
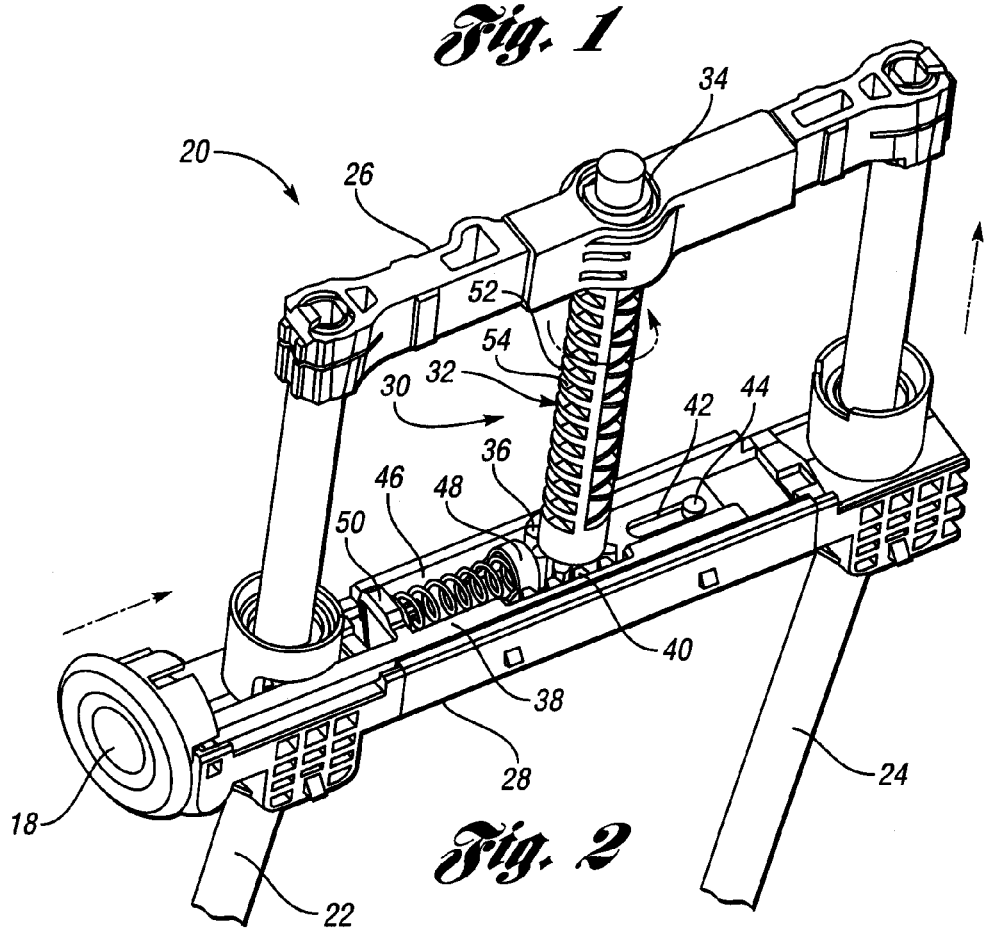
FIG. 2 is a rear perspective view of a head restraint height adjustment mechanism of the vehicle seat of FIG. 1.

Referring now to FIG. 2, the head restraint 16 is illustrated with a head restraint cover and foam padding removed to reveal a head restraint height adjustment mechanism 20. The height adjustment mechanism 20 includes a pair of rods 22, 24 that are mounted to a frame of the seat back 14 and extend above the seat back 14 for supporting the head restraint 16. The rods 22, 24 are connected at their distal ends by an upper transverse bar 26. Likewise, a lower transverse bar 28 is mounted to the rods 22, 24 to translate along the rods 22, 24 to perform the height adjustment of the head restraint 16. Accordingly, the lower transverse bar 28 provides a frame for the head restraint 16 and the padding and cover of the head restraint 16 are mounted directly to the lower transverse bar 28 and translate along the rods 22, 24 with the translation of the lower transverse bar 28.

The height adjustment mechanism 20 includes a locking device 30 for locking the location of the lower transverse bar 28 along the rods 22, 24 relative to the upper transverse bar 26. The locking device 30 includes a locking shaft 32 that is oriented generally centrally on the lower transverse bar 28 between the rods 22, 24. The locking shaft 32 is generally parallel to the regions of the rods 22, 24 upon which the lower transverse bar 28 translates for height adjustment of the head restraint 16. The locking shaft 32 is pivotally connected to the lower transverse bar 28 and extends to the upper transverse bar 26. The locking shaft 32 extends through a bore 34 in the upper transverse bar 26 and cooperates with the bore 34, which provides a stop for locking the lower transverse bar 28 relative to the upper transverse bar 26.

The locking shaft 32 is illustrated in a locked position in FIG. 2. The locking shaft 32 includes a pinion gear 36 formed upon its lower end adjacent to the lower transverse bar 28. The release button 18 is mounted on a lateral end of the lower transverse bar 28. The release button 18 cooperates with an actuation bar 38 that is mounted in the lower transverse bar 28 to slide along the lower transverse bar 28. The actuation bar 38 includes a gear rack 40 formed on an inboard side in engagement with the pinion gear 36 of the locking shaft 32. The actuation bar 38 includes a slot 42, which receives a projection 44 of the lower transverse bar 28 to constrain the actuation bar 38 to linear translation relative to the lower transverse bar 28. Thus, when the release button 18 is actuated, the actuation bar 38 is translated towards the rod 24 thereby rotating the locking shaft 32 counterclockwise in FIG. 2 to a release position whereby height adjustment of the head restraint 16 is permitted. A coil compression spring 46 is mounted in a receiver 48 on the lower transverse bar 28 and engages a tab 50 extending from the actuation bar 38 to bias the actuation bar 38 to the locked position of FIG. 2, thereby locking the head restraint 16 in absence of a force imparted upon the release button 18.

Figure 3:
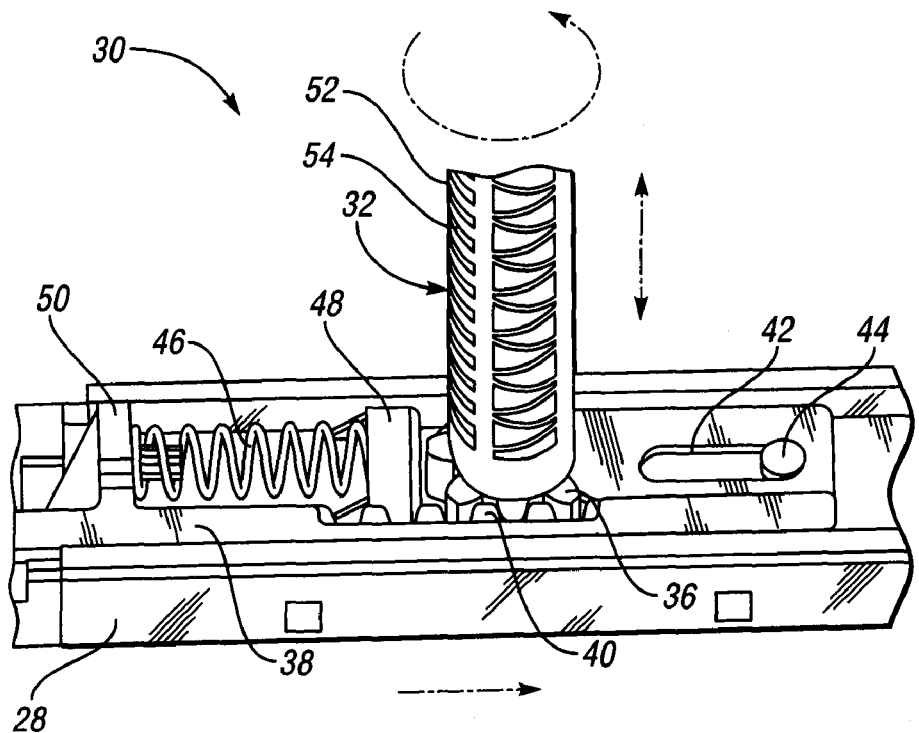
FIG. 3 is an enlarged perspective view of a portion of the head restraint height adjustment mechanism of FIG. 2, illustrated in a locked position.
Figure 4:
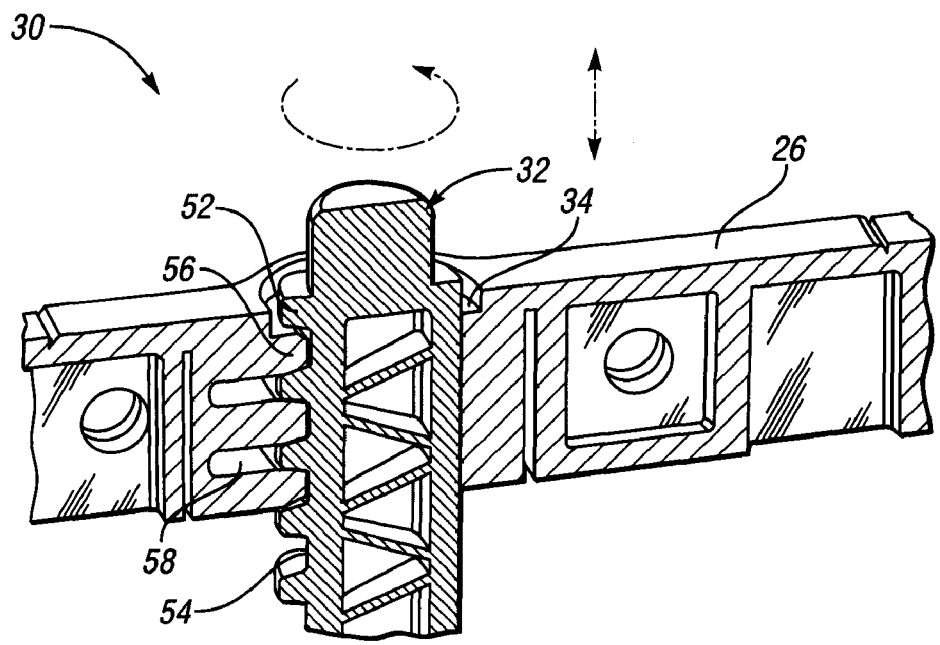
FIG. 4 is a partial section perspective view of another portion of the head restraint height adjustment mechanism of FIG. 2, illustrated in the locked position.

Referring now to FIGS. 3 and 4, the actuation bar 38 and locking shaft 32 are illustrated in the locked position in FIG. 3 and the locking shaft 32 and upper transverse bar 26 are illustrated in the locked position in FIG. 4. The locking shaft 32 has a series of incrementally spaced projections 52, that are spaced longitudinally along the locking shaft 32 by a series of recesses 54. The projections 52 extend radially outboard from a lateral region of the locking shaft 32. Likewise, the bore 34 of the upper transverse bar 26 includes a corresponding series of projections 56 sized to be received within the recesses 54 of the locking shaft 32 and the projections 56 are spaced incrementally by a series of recesses 58 for receiving the projections 52 of the locking shaft 32. The projections 56 and recesses 58 are provided on one lateral region of the bore 34 as illustrated in FIG. 4. Thus, when the locking shaft 32 is in the locked position of FIGS. 3 and 4, the projections 52 and recesses 54 of the locking shaft 32 are engaged with the corresponding projections 56 and recesses 58 of the upper transverse bar 26.

Figure 5:
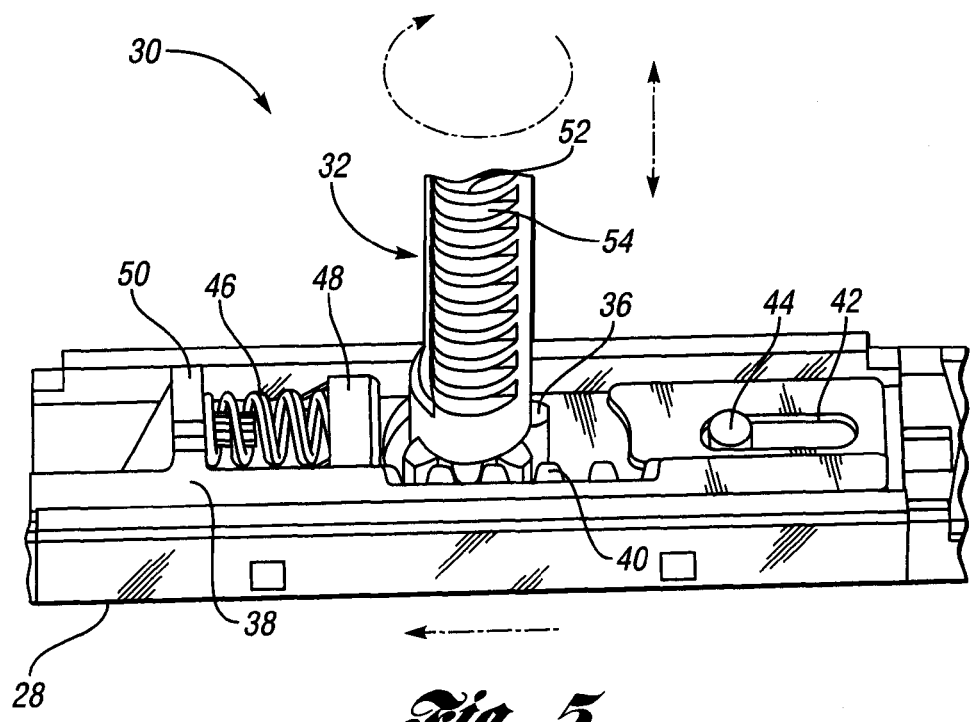
FIG. 5 is another enlarged perspective view of the portion of the head restraint height adjustment mechanism of FIG. 3, illustrated in a released position.
Figure 6:
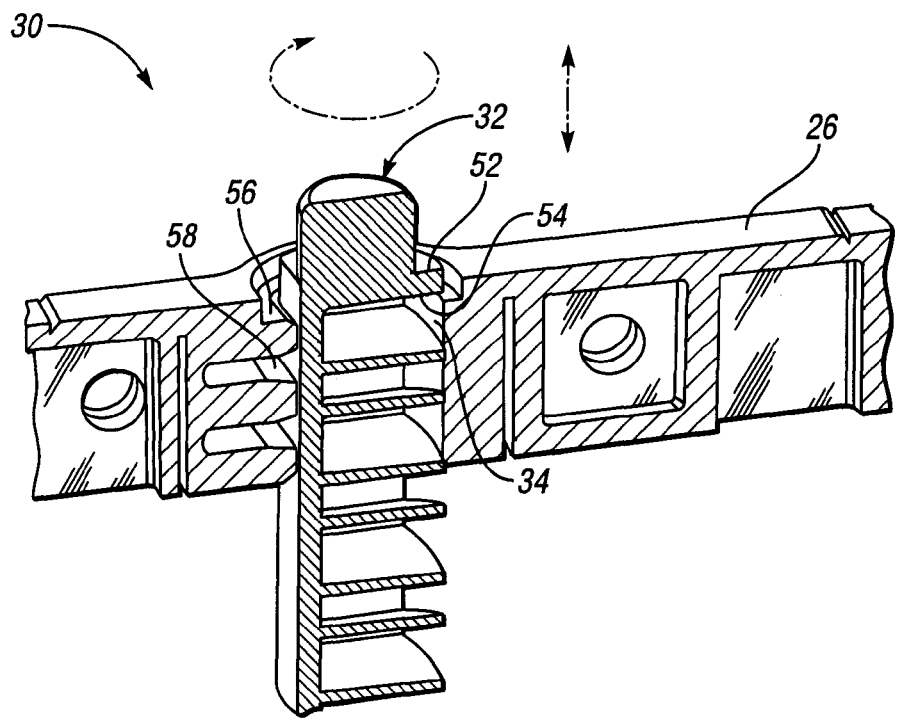
FIG. 6 is another enlarged partial section view of the portion of the head restraint of FIG. 4, illustrated in the released position.

As stated above, actuation of the release button 18 translates the actuation bar 38 towards the rod 24 thereby rotating the locking shaft 32 counterclockwise to disengage the projections 52 and recesses 54 of the locking shaft 32 from the projections 56 and recesses 58 of the bore 34. Referring now to FIGS. 5 and 6, the actuation bar 38 is illustrated translated towards the rod 24 and consequently the locking shaft 32 is illustrated in the released position. As illustrated in FIG. 6, the locking shaft 32 has been rotated such that the projections 52 and recesses 54 are rotated out of engagement with the projections 56 and the recesses 58 of the bore 34 of the upper transverse bar 26. Thus, in the unlocked position of FIGS. 5 and 6, the user may translate the lower transverse bar 28 and the head restraint 16 along the rods 22, 24 until a desired height adjustment position is achieved. Once the desired height adjustment position is selected, the user removes a manual force from the release button 18. Then, the spring 46 expands thereby translating the actuation bar 38 towards the rod 22, which drives the pinion gear 36 of the locking shaft 32 clockwise in FIGS. 5 and 6 until the shaft 32 is in the locked position illustrated in FIGS. 3 and 4.

Thus, the height adjustment mechanism 20 permits simplified height adjustment of the head restraint 16. An adjustment may be performed manually with one hand by depressing the release button 18 and translating the head restraint 16 to the desired height adjustment. By eliminating notches in the rods 22, 24, which are common in the prior art, the wall thickness of the rods 22, 24 can be reduced thereby reducing the weight and complexity of the rods 22, 24 and providing a cost savings in the material of the rods 22, 24. Additionally, various head restraint rod 22, 24 configurations and cross sections are possible by elimination of the lock mechanism on the rods 22, 24.

Prior art head restraint height adjustment mechanisms that utilize notches in the head restraint rods are limited in the number of adjustment positions. The head restraint rods are structural members and therefore the notches are adequately spaced to prevent weakening of the head restraint rods. The height adjustment mechanism 20 permits more adjustment positions since the notches are not provided on the head restraint rods 22, 24.

The components of the head restraint height adjustment mechanism 20 may be formed from suitable materials, such as structural plastics or metals. Thus, the complexity of the locking of the head restraint 16 relative to the seat back 14 is removed from the rods 22, 24 and concealed within the head rest 16. Additionally, a secured locking arrangement is provided by engagement of multiple projections 52 and recesses 54 of the locking shaft 32 with multiple projections 56 and recesses 58 of the bore 34 of the upper transverse bar 26. Thus, the locking arrangement is more secure and stable than a prior art single detent within a recess; and a reduction in buzz, squeak and rattle is provided by the enhanced locking arrangement.

Figure 7:
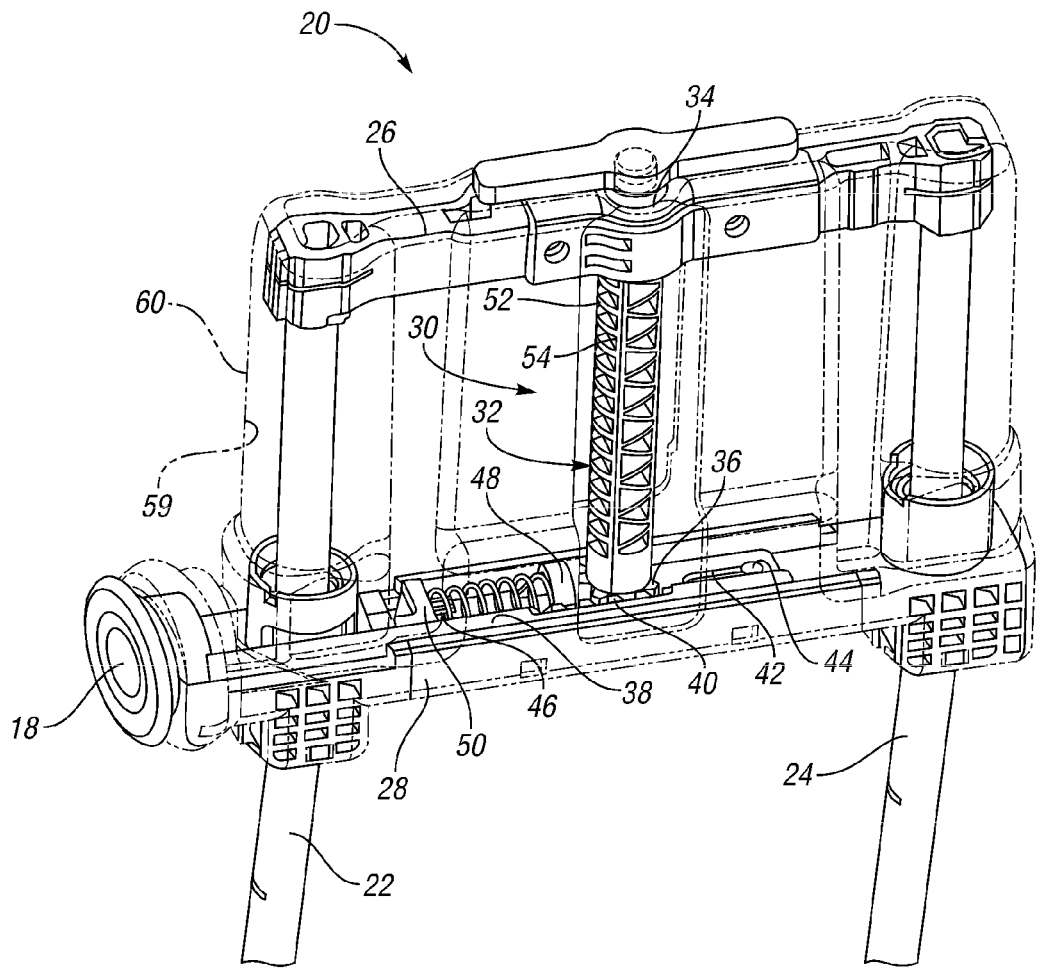
FIG. 7 is another rear perspective view of the head restraint height adjustment mechanism of FIG. 2.

Referring now to FIG. 7, the height adjustment mechanism 20 is illustrated concealed within a cavity 59 of a shell 60 that is depicted in phantom. The shell 60 is mounted to the lower transverse bar 28 and conceals the upper transverse bar 26 and locking device 30 in multiple height adjustment positions of the height adjustment mechanism 20. The foam padding of the head restraint 16 may be formed directly upon the shell 60 and subsequently a cover may be provided over the foam and shell 60 to provide a completed head restraint 16. In at least one embodiment, the shaft 32 is journalled directly within the shell 60 for providing bearing support to the distal end of the shaft 32 when fully extended through the upper transverse 26.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat comprising:
   a seat back for supporting a back of an occupant;
   a rod mounted to and extending from the seat back;
   a stop mounted to the rod;
   a frame mounted to the rod to slide along the rod;

a head restraint mounted to the frame for supporting a head of an occupant;

a locking mechanism cooperating with the stop and the frame for permitting incremental locking positions of the frame relative to the stop; and an actuator for releasing the locking mechanism to slide the head restraint and frame along the rod;

wherein the locking mechanism further comprises a rotatable shaft, wherein one of the shaft and the stop includes a longitudinal series of notches, and wherein the other of the shaft and the stop includes at least one projection that engages one of the series of notches in a locked rotary position of the shaft and the at least one projection is disengaged from the series of notches in a released rotary position of the shaft for sliding the head restraint and frame along the rod.

2. The vehicle seat of claim 1 wherein the shaft includes a pinion gear; wherein the actuator further comprises a gear rack in engagement with the pinion gear, the pinion gear and gear rack rotating the shaft between the locked and released positions.

3. The vehicle seat of claim 2 further comprising a button oriented on a side of the head restraint in cooperation with the gear rack for translating the gear rack.

4. The vehicle seat of claim 1 wherein the shaft includes a longitudinal series of alternating notches and projections and the stop includes a second longitudinal series of alternating notches and projections to engage the notches and projections of the shaft in the locked position of the shaft.

5. The vehicle seat of claim 4 wherein the shaft projections extend radially outboard from the shaft to engage the stop notches in the locked rotary position of the shaft.

6. The vehicle seat of claim 1 wherein the rod further comprises a pair of generally parallel rods, the stop further comprises a bracket mounted to the pair of rods, the frame is mounted to slide on both rods, and the shaft is mounted to the frame to rotate relative to the frame and in engagement with the stop.

7. The vehicle seat of claim 6 wherein the shaft is mounted generally centrally between the pair of rods.

8. The vehicle seat of claim 1 wherein the shaft is oriented generally parallel to the rod.

9. The vehicle seat of claim 1 wherein the stop further comprises a bore for receiving the shaft and permitting the shaft to translate relative to the stop as the frame is slid along the rod, and wherein one of the longitudinal series of notches and the at least one projection is oriented within the bore.

10. The vehicle seat of claim 1 further comprising a biasing member for maintaining the shaft in the locked position.

11. The vehicle seat of claim 10 wherein the biasing member engages the actuator maintaining the shaft and the actuator in the locked position.

12. The vehicle seat of claim 1 further comprising a shell mounted to the frame for enclosing the frame, stop and locking mechanism, wherein a distal end of the shaft is supported by the shell.

13. The vehicle seat of claim 1 wherein the rod further comprises a pair of generally parallel rods and the frame is mounted to slide on both rods.

14. The vehicle seat of claim 1 wherein the rod further comprises a pair of generally parallel rods and the stop further comprises a bracket mounted to the pair of rods.

15. The vehicle seat of claim 1 further comprising a shell mounted to the frame for enclosing the frame, stop and locking mechanism.

16. The vehicle seat of claim 15 wherein the shell has a cavity sized to received the rod in a retracted position of the head restraint.

17. A vehicle seat head restraint comprising:
a stop adapted to be mounted to a rod extending from a vehicle seat back;
a frame adapted to be mounted to the rod to slide along the rod;
a head restraint foam padding and cover mounted to the frame for supporting a head of an occupant;
a locking mechanism cooperating with the stop and the frame for permitting incremental locking positions of the frame relative to the stop; and
an actuator for releasing the locking mechanism to slide the head restraint and frame along the rod;
wherein the locking mechanism further comprises a rotatable shaft, wherein one of the shaft and the stop includes a longitudinal series of notches, and wherein the other of the shaft and the stop includes at least one projection that engages one of the series of notches in a locked rotary position of the shaft and the at least one projection is disengaged from the series of notches in a released rotary position of the shaft for sliding the head restraint and frame along the rod.

18. A vehicle seat comprising:
a seat back for supporting a back of an occupant;
a rod mounted to and extending from the seat back;
a stop mounted to the rod, having a bore with a first longitudinal series of alternating notches and projections;
a frame mounted to the rod to slide along the rod;
a head restraint mounted to the frame for supporting a head of an occupant;
a rotatable locking shaft connected to the frame and oriented generally parallel to the rod, the shaft having a longitudinal series of alternating notches and projections to engage the notches and projections of the stop in a locked rotary position of the shaft for permitting incremental locking positions of the frame relative to the stop, and to disengage from the notches and projections of the stop in a released rotary position of the shaft to translate relative to the stop through the bore, the shaft having a pinion gear;
a gear rack in engagement with the pinion gear for rotating the shaft between the locked and released positions for releasing the locking mechanism to slide the head restraint and frame along the rod; and
a button oriented on a side of the head restraint in cooperation with the gear rack for translating the gear rack.

19. The vehicle seat of claim 17 wherein the shaft includes a pinion gear; wherein the actuator further comprises a gear rack in engagement with the pinion gear, the pinion gear and gear rack rotating the shaft between the locked and released positions.

* * * * *